(12) United States Patent  
Piramuthu et al.

(10) Patent No.: US 8,300,936 B2  
(45) Date of Patent: Oct. 30, 2012

(54) SYSTEM AND METHOD FOR IMPROVING DISPLAY OF TUNED MULTI-SCALED REGIONS OF AN IMAGE WITH LOCAL AND GLOBAL CONTROL

(75) Inventors: Robinson Piramuthu, Oakland, CA (US); Mark Rollins, Berkeley, CA (US)

(73) Assignee: FlashFoto, Inc., Oakland, CA (US)

( * ) Notice: Subject to any disclaimer, the term of this patent is extended or adjusted under 35 U.S.C. 154(b) by 1151 days.

(21) Appl. No.: 12/062,504

(22) Filed: Apr. 3, 2008

(65) Prior Publication Data

US 2008/0247648 A1 Oct. 9, 2008

Related U.S. Application Data

(60) Provisional application No. 60/909,918, filed on Apr. 3, 2007.

(51) Int. Cl.  
*G06K 9/34* (2006.01)

(52) U.S. Cl. .................................................. 382/173

(58) Field of Classification Search .................. 382/103, 382/164, 173, 176, 180, 190, 195, 284; 358/450, 358/453, 464, 538; 348/169, 208.14, 394.1, 348/431.1; 345/629, 634; 375/240, 240.12

See application file for complete search history.

(56) References Cited

U.S. PATENT DOCUMENTS 6,205,260 B1 * 3/2001 Crinon et al. ................. 382/284  
7,436,981 B2 * 10/2008 Pace ............................. 382/103

* cited by examiner

*Primary Examiner* — Jose Couso

(57) ABSTRACT

A system for improved display of tuned multi-scaled regions of an image with local and global control and methods for making and using same. To assist the novice user of image processing tool, less input parameters should be required. Further, it will assist the user if results are diplayed in a shorter period of time. Utilizing a hierarchical bottom-up approach provides for the advantage of being able to utilize intermediate results to gather more details. The systems and methods disclosed provide for the grouping of contiguous pixels which have similar properties. Further, the disclosed embodiments provide for the user the ability to see all levels of detail of segmentation either globally or locally. The scale-space is tuned to the information in the image.

20 Claims, 16 Drawing Sheets

SYSTEM AND METHOD FOR IMPROVING DISPLAY OF TUNED MULTI-SCALED REGIONS OF AN IMAGE WITH LOCAL AND GLOBAL CONTROL

CROSS REFERENCE TO RELATED APPLICATIONS

This application claims priority to a U.S. provisional patent application Ser. No. 60/909,918, filed Apr. 3, 2007. Priority to the provisional application is expressly claimed, and the disclosure of the provisional application is hereby incorporated herein by reference in its entirety.

BACKGROUND

With the advancement, ease of use, and decline of prices for digital cameras, the number of digital photographs and images throughout the world has increased substantially. Very often, the digital photographs and images are not completely satisfactory to the persons taking or viewing them. Indeed, many computer aided techniques exist to manipulate, retouch, or otherwise edit digital photographs and images.

Often the grouping of pixels that are spatially contiguous and have similar information within them can assist in the computer aided techniques, namely segmentation of the image. Examples of this grouping, each of which is hereby incorporated by reference herein in its entirety, can be found in: "Normalized Cuts and Image Segmentation," J. Shi, J. Malik, IEEE Trans. On Pattern Analysis and Machine Intelligence, Vol. 22, No. 8, pp 888-905, August 2000; "Learning a Classification Model for Segmentation," X. Ren, J. Malik, ICCV 2003, Vol. 1, pp 10-17; and, "Clustering Appearance and Shape by Learning Jigsaws," A. Kannan, J. Winn, C. Rother, NIPS 2006, each of which is hereby incorporated by reference herein. An example of an application attempting to utilize this principle can be found in a product called Fluid-Mask, created by the company Vertus.

The problem with the current applications which utilize grouping principles is the high level of sophistication necessary to truly gain the benefit from the principle. Generally, the user is required to tweak many parameters within a period of time to obtain sought after results. It is difficult for the user to select optimal parameters for the principle because of the difficulty of truly understanding how all the parameters will affect the grouping of pixels and the resulting grouping is highly dependent on the details found in any given image. As should be evident, there is an unfulfilled need for systems and methods which will increase the ease with which a user can utilize the grouping principle as well as the effectiveness of the grouping principle during image processing.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the present invention.

Figure 1:
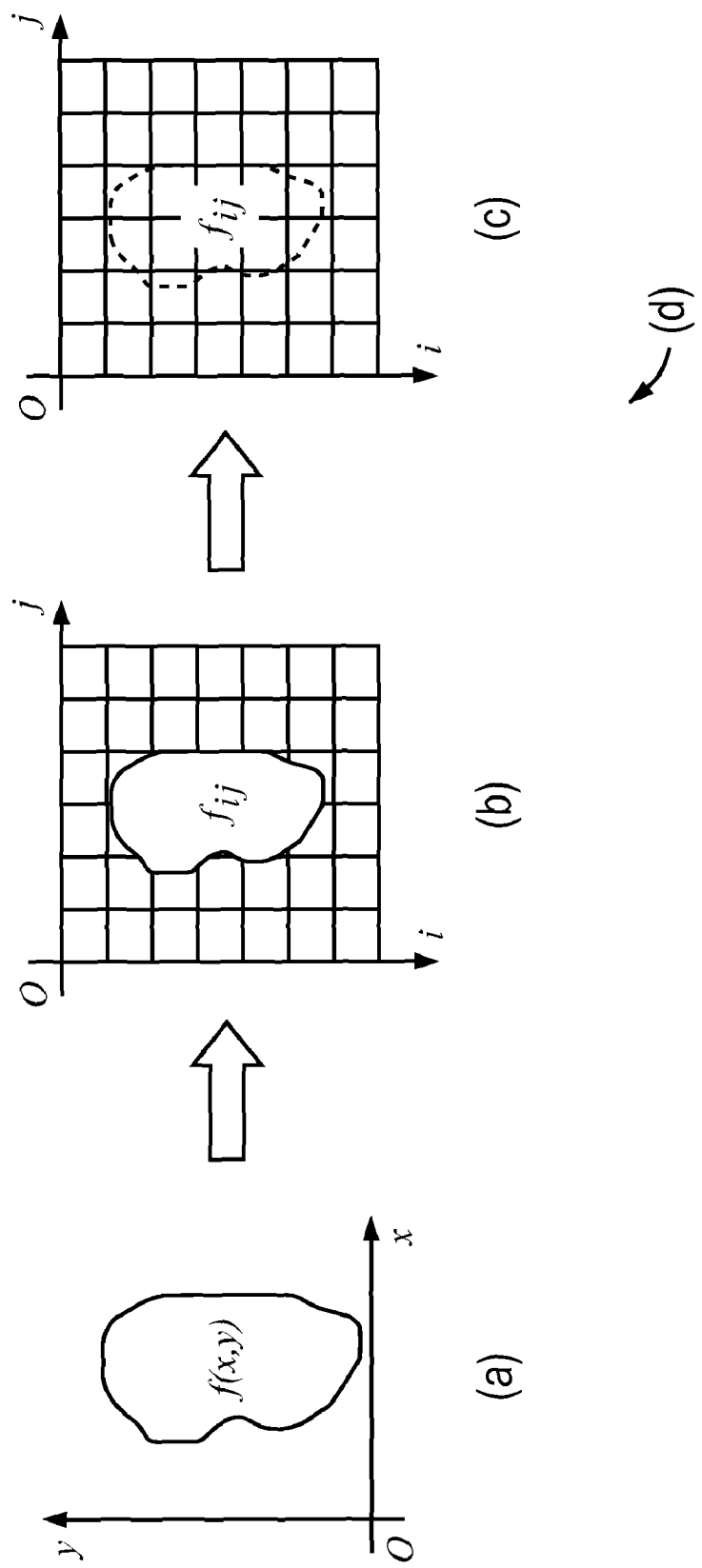
FIG. 1 is an illustration of a continuous space function $f(x,y)$ into a digital image $f_{ij}$.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION

A system for improved display of tuned multi-scaled regions of an image with better local and global control and methods for making and using same is provided.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The disclosed embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed embodiments are not described with reference to any particular programming language. It will be appreciated that a variety of programming languages may be used to implement the teachings of the embodiments as described herein.

The disclosed embodiments relate to systems and methods for segmenting an image based on perceptual information. The disclosed embodiments utilize visual information processing based on dynamic perceptual organization, and psychophysical principles. In one embodiment described below, the visual information processing will segment an image into foreground and background regions. Foreground is defined broadly as any region or regions of an image that one would consider to be the subject or object within the image. Often, the foreground of an image is referred to as the "figure." Background is defined broadly as any region or regions of an image that one would consider not being the subject or object within the image. Often, the background of an image is referred to as the "ground."

In some embodiments an image is a bitmapped or pixmapped image. As used herein, a bitmap or pixmap is a type of memory organization or image file format used to store digital images. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap implies one bit per pixel, while a pixmap is used for images with multiple bits per pixel. One example of a bitmap is a specific format used in Windows that is usually named with the file extension of .BMP (or .DIB for device-independent bitmap). Besides BMP, other file formats that store literal bitmaps include InterLeaved Bitmap (ILBM), Portable Bitmap (PBM), X Bitmap (XBM), and Wireless Application Protocol Bitmap (WBMP). In addition to such uncompressed formats, as used herein, the term bitmap and pixmap refers to compressed formats. Examples of such bitmap formats include, but are not limited to, formats, such as JPEG, TIFF, PNG, and GIF, to name just a few, in which the bitmap image (as opposed to vector images) is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, Computer Graphics: Principles and Practice, Addison-Wesley Professional, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel (2 n colors) bitmap, in bytes, can be calculated as: size≈width×height×n/8, where height and width are given in pixels. In this formula, header size and color palette size, if any, are not included. Due to effects of row padding to align each row start to a storage unit boundary such as a word, additional bytes may be needed.

In computer vision, segmentation refers to the process of partitioning a digital image into multiple regions (sets of pixels). The goal of segmentation is to simplify and/or change the representation of an image into something that is more meaningful and easier to analyze. Image segmentation is typically used to locate objects and boundaries (lines, curves, etc.) in images.

The result of image segmentation is a set of regions that collectively cover the entire image, or a set of contours extracted from the image. Each of the pixels in a region share a similar characteristic or computed property, such as color, intensity, or texture. Adjacent regions are significantly different with respect to the same characteristic(s).

Several general-purpose algorithms and techniques have been developed for image segmentation. Exemplary segmentation techniques are disclosed in *The Image Processing Handbook*, Fourth Edition, 2002, CRC Press LLC, Boca Raton, Fla., Chapter 6, which is hereby incorporated by reference herein for such purpose. Since there is no general solution to the image segmentation problem, these techniques often have to be combined with domain knowledge in order to effectively solve an image segmentation problem for a problem domain.

In some embodiments, a segmentation technique used in accordance with the present invention is a clustering method such as a K-means algorithm. The K-means algorithm is an iterative technique that is used to partition an image into K clusters. The basic algorithm is i) pick K cluster centers, either randomly or based on some heuristic;

ii) assign each pixel in the image to the cluster that minimizes the variance between the pixel and the cluster center;

iii) re-compute the cluster centers by averaging all of the pixels in the cluster; and iv) repeat steps i) and iii) until convergence is attained (e.g. no pixels change clusters) and/or or steps i) and iii) have been repeated a predetermined number of times. In this case, variance is the squared or absolute difference between a pixel and a cluster center. The difference is typically based on pixel color, intensity, texture, and location, or a weighted combination of these factors. K can be selected manually, randomly, or by a heuristic. This algorithm is guaranteed to converge, but it may not return the optimal solution. The quality of the solution depends on the initial set of clusters and the value of K. For more information, see Duda, 2002, *Pattern Classification*, pp. 526-528, John Wiley & Sons, Inc., New York, which is hereby incorporated by reference herein in its entirety.

In some embodiments, a segmentation technique used in accordance with the present invention is a histogram-based method. Histogram-based methods typically require only one pass through the pixels. In this technique, a histogram is computed from all of the pixels in the image, and the peaks and valleys in the histogram are used to locate the clusters in the image. Color or intensity can be used as the measure. A refinement of this technique is to recursively apply the histogram-seeking method to clusters in the image in order to divide them into smaller clusters. This is repeated with smaller and smaller clusters until no more clusters are formed.

In some embodiments, a segmentation technique used in accordance with the present invention is an edge detection method. Edge detection is a well-developed field on its own within image processing. Region boundaries and edges are closely related, since there is often a sharp adjustment in intensity at the region boundaries. Edge detection techniques have therefore been used to as the base of another segmentation technique. The edges identified by edge detection are often disconnected. To segment an object from an image however, one needs closed region boundaries. Discontinuities are bridged if the distance between the two edges is within some predetermined threshold.

In some embodiments, a segmentation technique used in accordance with the present invention is region growing method. One region growing method is the seeded region growing method. This method takes a set of seeds as input along with the image. The seeds mark each of the objects to be segmented. The regions are iteratively grown by comparing all unallocated neighboring pixels to the regions. The difference between a pixel's intensity value and the region's mean, $\delta$, is used as a measure of similarity. The pixel with the smallest difference measured this way is allocated to the respective region. This process continues until all pixels are allocated to a region. Seeded region growing requires seeds as additional input. The segmentation results are dependent on the choice of seeds. Noise in the image can cause the seeds to be poorly placed. Unseeded region growing is a modified algorithm that doesn't require explicit seeds. It starts off with a single region $A_1$—the pixel chosen here does not significantly influence final segmentation. At each iteration it considers the neighboring pixels in the same way as seeded region growing. It differs from seeded region growing in that if the minimum $\delta$ is less than a then a predefined threshold T then it is added to the respective region $A_j$. If not, then the pixel is considered significantly different from all current regions $A_i$ and a new region $An+1$ is created with this pixel. One variant of this technique, proposed by Haralick and Shapiro, 1985, *Computer Vision*, pp. 279-325, Prentice-Hall, New Jersey, which is hereby incorporated by reference herein, is based on pixel intensities. The mean and scatter of the region and the intensity of the candidate pixel is used to compute a test statistic. If the test statistic is sufficiently small, the pixel is added to the region, and the region's mean and scatter are recomputed. Otherwise, the pixel is rejected, and is used to form a new region.

In some embodiments, a segmentation technique used in accordance with the present invention is a graph partitioning method such as the "normalized cuts" method. See, for example, Shi and Malik, 1997, "Normalized Cuts and Image Segmentation," IEEE Conference on Computer Vision and Pattern Recognition, pp. 731-737, which is hereby incorporated by reference herein in its entirety. In the "normalized cuts" method, the image being segmented is modeled as a weighted undirected graph. Each pixel is a node in the graph, and an edge is formed between every pair of pixels. The weight of an edge is a measure of the similarity between the pixels. The image is partitioned into disjoint sets (segments) by removing the edges connecting the segments. The optimal partitioning of the graph is the one that minimizes the weights of the edges that were removed (the "cut"). Shi's algorithm seeks to minimize the "normalized cut", which is the ratio of the "cut" to all of the edges in the set.

In some embodiments, a segmentation technique used in accordance with the present invention is a watershed transformation. The watershed transformation considers the gradient magnitude of an image as a topographic surface. Pixels having the highest gradient magnitude intensities (GMIs) correspond to watershed lines, which represent the region boundaries. Water placed on any pixel enclosed by a common watershed line flows downhill to a common local intensity minima (LMI). Pixels draining to a common minimum form a catchment basin, which represent the regions.

In some embodiments, a segmentation technique used in accordance with the present invention is a model based segmentation. The central assumption of such an approach is that structures of interest/organs have a repetitive form of geometry. Therefore, one can seek for a probabilistic model towards explaining the variation of the shape of the organ and then when segmenting an image impose constraints using this model as prior. Such a task involves (i) registration of the training examples to a common pose, (ii) probabilistic representation of the variation of the registered samples, and (iii) statistical inference between the model and the image. Methods in the literature for knowledge-based segmentation involve active shape and appearance models, active contours and deformable templates and level-set based methods.

In some embodiments, a segmentation technique used in accordance with the present invention is a multi-scale segmentation in which image segmentations are computed at multiple scales in scale-space and sometimes propagated from coarse to fine scales. Segmentation criteria can be arbitrarily complex and may take into account global as well as local criteria. A common requirement is that each region must be connected in some sense.

In some embodiments, a segmentation technique used in accordance with the present invention is a semi-automatic segmentation. In this kind of segmentation, the user outlines the region of interest with the mouse clicks and algorithms are applied so that the path that best fits the edge of the image is shown.

In some embodiments, a segmentation technique used in accordance with the present invention is a neural network segmentation. A neural network segmentation relies on processing small areas of an image using a neural network or a set of neural networks. After such processing the decision-making mechanism marks the areas of an image accordingly to the category recognized by the neural network.

As mentioned above, the segmentation of an image whereby pixels within the image are grouped based on spatial contiguousness and similar information can provide very beneficial results for image processing. The difficulty for novice users of complex algorithms within image processing is the ability to understand the parameters of the algorithm to provide meaningful results. Often, the novice user is expected to tweak parameters of the algorithms to obtain optimal results but isn't able to perform the task due to lack of knowledge about the parameters. To avoid this, it would be beneficial to make use of intermediate results and to provide local control for viewing the image in multiple tuned-scales.

FIG. 1 is an illustration of a continuous space function $f(x,y)$ into a digital image $f_{ij}$. Each pixel is the result of integration of the continuous function under a kernel $w_{ij}(xy)$. Object (a) in FIG. 1 represents an object being defined in a continuous function $f(.)$ in spatial coordinates x, y. Object (b) represents that object converted to a digital image whereby it is mapped to several pixels. Object (c) represents the integration of the continuous space function under a kernel $w_{ij}(x,y)$ as defined by equation (d).

Scale-space theory is a framework for multi-scale signal representation developed by the computer vision, image processing and signal processing communities with complementary motivations from physics and biological vision. It is a formal theory for handling image structures at different scales, by representing an image as a one-parameter family of smoothed images, the scale-space representation, parameterized by the size of the smoothing kernel used for suppressing fine-scale structures. The parameter t in this family is referred to as the scale parameter, with the interpretation that image structures of spatial size smaller than about $\sqrt{t}$ have largely been smoothed away in the scale-space level at scale t.

The main type of scale-space is the linear (Gaussian) scale-space, which has wide applicability as well as the attractive property of being possible to derive from a small set of scale-space axioms. The corresponding scale-space framework encompasses a theory for Gaussian derivative operators, which can be used as a basis for expressing a large class of visual operations for computerized systems that process visual information. This framework also allows visual operations to be made scale invariant, which is necessary for dealing with the size variations that may occur in image data, due to the fact that real-world objects may be of different sizes and in addition the distance between the object and the camera may be unknown and may vary depending on the circumstances.

The notion of scale-space applies to signals of arbitrary numbers of variables. A known case in the literature applies to two-dimensional images. For a given image $f(x,y)$, its linear (Gaussian) scale-space representation is a family of derived signals $L(x,y;t)$ defined by the convolution of $f(x,y)$ with the Gaussian kernel $$g(x, y; t) = \frac{1}{2\pi t} e^{-(x^2+y^2)/2t}$$

such that $$L(x, y; t) = g(x, y; t) * f(x, y),$$

where the semicolon in the argument of g implies that the convolution is performed only over the variables x,y, while the scale parameter t after the semicolon just indicates which scale level is being defined. This definition of L works for a continuum of scales $t \geq 0$, but typically only a finite discrete set of levels in the scale-space representation would be actually considered.

The variable t is the variance of the Gaussian filter and for $t=0$ the resulting filter g becomes an impulse function such that $L(x,y,x0)=f(x,y)$, that is, the scale-space representation at scale level $t=0$ is the image $f$ itself. As t increases, L is the result of smoothing $f$ with a larger and larger filter, thereby removing more and more of the details which it contains. Since the standard deviation of the filter is $\sqrt{t}$, details which are significantly smaller than this value are to a large extent removed from the image at scale parameter t.

Traditional multi-scale analysis can be categorized into methods: overlapping kernels with the same number of pixels; and overlapping kernels with a different number of pixels. When overlapping with the same number of pixels, the kernels $w_{ij}(x,y)$ overlap for adjacent values of i, j, for the same number of pixels. The shape of the kernel is identical for all pixels in the image. For example, each scale uses a Gaussian kernel with different shape parameter $\sigma$, which is the standard deviation of the Gaussian. When overlapping with a different number of pixels, the number of pixels in the image is modified across a scale-space. For example, an original image of dimensions 256×256 is shrunk to images of dimensions 128×128, or 64×64, etc. in this scale-space.

According to one embodiment of the present invention, the shape and size of kernels are spatially variant. The number of hyper-pixels depends on the amount of detail and/or redundancy in the given image. For example, if the original set of pixels has regions which have a lot of redundancy, the pixels in the regions will be merged together and treated as a single unit (hyper-pixel). As the scale is changed, the size and shape of the hyper-pixels will change. This allows for multi-scale analysis without being limited to the traditional categories.

Figure 2:
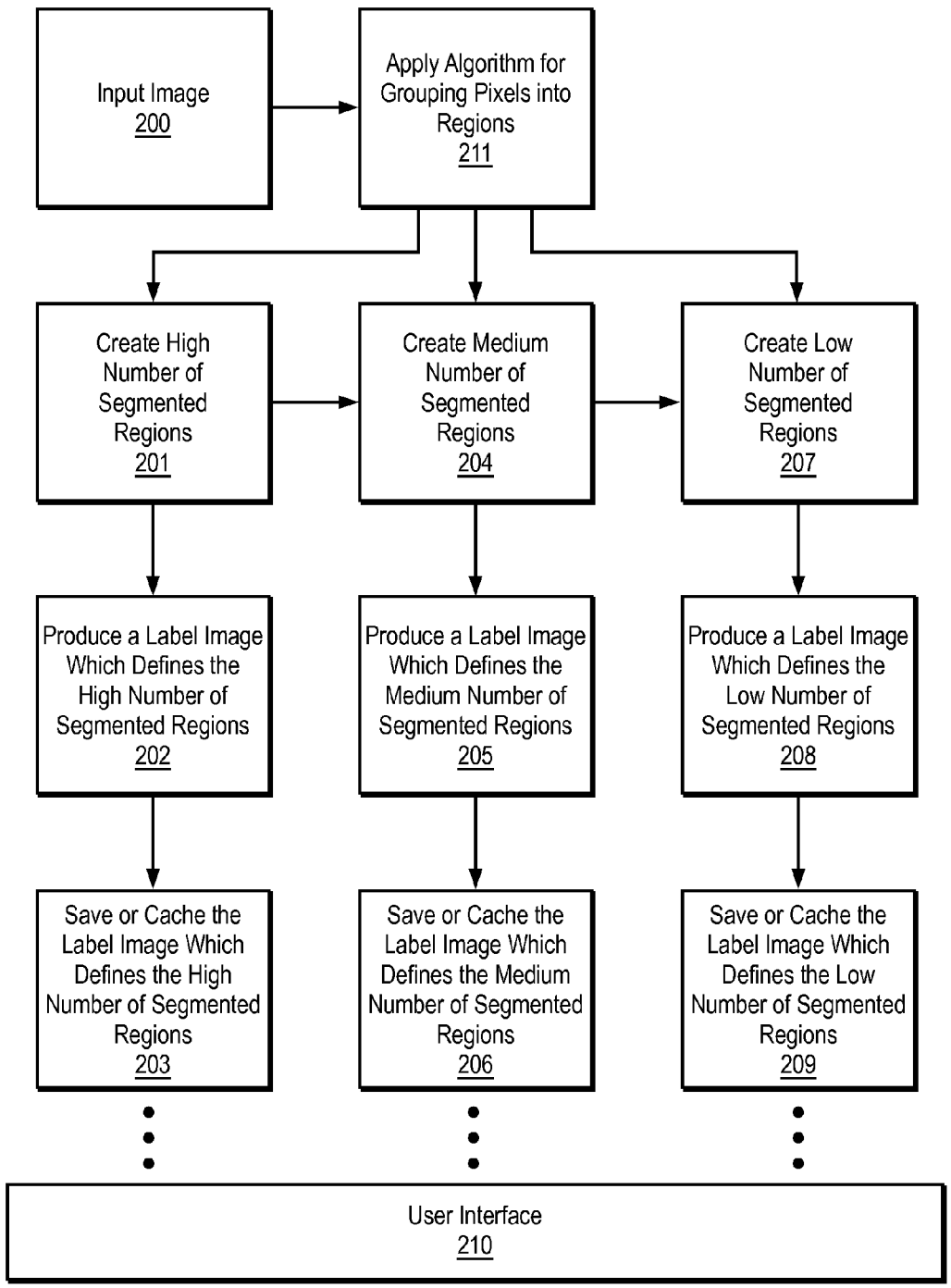
FIG. 2 is a top-level flow diagram for a method according to one embodiment for improved display of tuned multi-scaled regions of an image with improved local and global control.

FIG. 2 is a top-level flow diagram for a method according to one embodiment for improved display of tuned multi-scaled regions of an image with better local and global control. Initially, the image to be processed is determined and inputted 200. The image data within the image will then be processed by an algorithm which groups pixels within the image into segmented regions 211. In one embodiment, the algorithm utilized to group the pixels will do so based on pixels that are spatially contiguous and/or pixels that contain similar information. For example, an algorithm for watershed transform could be utilized. In another embodiment, the algorithm comprises a parameter or parameters allowing for controlling the number of segmented regions. For example, the parameter or parameters could allow for the control of the level detail utilized in determining the number of segmented regions. In an additional embodiment, the parameter or parameters are set within the algorithm such that the algorithm will perform one or more iterations, each iteration generating a set of segmented regions, each set containing a different number of segmented regions but each set relating to each other. An example of the relation between sets can be the grouping of segmented regions on a hierarchical basis.

For example, a first iteration could create a set of ten regions and a second iteration could create a set of five regions, where the second iteration's set comprises of regions which combined one or more regions in the first iteration's set. In other words, a region in the second iteration's set may represent or comprise two or more regions from the first iteration's set. In some embodiments, any number of iterations are performed where the maximum number of iterations is controlled by the limitations of the algorithm utilized to process an image.

For illustrative purposes, the embodiment in FIG. 2 utilizes three different iterations: the creation of a high-number of segmented regions 201; the creation of a medium-number of segmented regions 204; and the creation of a low-number of regions 207.

Figure 3:
FIG. 3 is a sample image provided in grayscale to illustrate the embodiment of the method in FIG. 2 for improved display of tuned multi-scaled regions of an image with improved local and global control.
Figure 4:
FIG. 4 is the same image from FIG. 3 segmented into a high-number of regions.
Figure 5:
FIG. 5 is the same image from FIG. 3 segmented into a medium-number of regions.
Figure 6:
FIG. 6 is the same image from FIG. 3 segmented into a low-number of regions.

FIG. 3 is a sample image provided in grayscale to illustrate the embodiment of the method in FIG. 2 for improved display of tuned multi-scaled regions of an image with local and global control. The image is processed by an algorithm 211 to create a high-number of segmented regions 201. FIG. 4 is the same image from FIG. 3 segmented into a high-number of regions. The image is processed by an algorithm 211 to create a medium-number of segmented regions 204. FIG. 5 is the same image from FIG. 3 segmented into a medium-number of regions. The image is processed by an algorithm 211 to create a low-number of segmented regions 207. FIG. 6 is the same image from FIG. 3 segmented into a low-number of regions. Optionally, the high-number of segmented regions is related to the medium-number of segmented regions which is related to the low-number of segmented regions in the sense that the same segmenting algorithm was used to construct each of these images, albeit using different parameter values for the segmenting algorithm.

Figure 7:
FIG. 7 is provided in grayscale to illustrate the average color within the segmented regions of FIG. 4.
Figure 8:
FIG. 8 is provided in grayscale to illustrate the average color within the segmented regions of FIG. 5.
Figure 9:
FIG. 9 is provided in grayscale to illustrate the average color within the segmented regions of FIG. 6.

An algorithm that utilizes the average colors between pixels within the image could be utilized for the combining or grouping of pixels into segmented regions. FIG. 7 is provided in grayscale to illustrate the average color within the segmented regions of FIG. 4. FIG. 8 is provided in grayscale to illustrate the average color within the segmented regions of FIG. 5. FIG. 9 is provided in grayscale to illustrate the average color within the segmented regions of FIG. 6.

Each iteration's result (here, high, medium, and low) can optionally be recorded or saved for later use. The recording or saving operation can comprise any conventional form of recording or saving operation, including creating a label image for each iteration and storing in cache.

In computer science, a cache is a collection of data duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, future use can be made by accessing the cached copy rather than re-fetching or recomputing the original data, so that the average access time is shorter. Cache, therefore, helps expedite data access that the CPU would otherwise need to fetch from main memory.

In the embodiment illustrated in FIG. 2, the three iterations which created a set of high-number of segmented regions 201, a set of medium-number of segmented regions 204, and a set of low-number of segmented regions 207 would then produce three label images (202, 205, 208, respectively). Each of the label images defines a set. The creation of a label image comprises any conventional form of creating a label image, including referencing each pixel with a non-negative integer, where the pixels with the same positive integer belong to the same group and pixels referenced with a zero (0) cannot or are not grouped. A similar process can be utilized for a label image defining a hyper-pixel. The label images are saved (optionally in cache) (203, 206, 209, respectively) so they may be utilized if necessary without having to re-run the iteration. Optionally, a user interface 210 can be utilized to view or select any saved iteration (via a label image). One advantageous aspect of the present embodiment is allowing an interface for the user to select an iteration without having to re-run the iteration. This aspect would allow the user to select segmented regions from one iteration and also select segmented regions from another iteration without losing the first selected segmentation regions.

In another embodiment for improved display of tuned multi-scaled regions of an image with better local and global control, an iterative bottom-up approach is utilized for creating segmented regions. The first iteration has the highest segmented regions (other than the raw image) for the segmentation algorithm chosen. As more iterations occur on the segmented regions from the first iteration, more segmented regions are grouped together hierarchically. Each iteration produces a label image which defines the various segmented regions created. Each of the results from the iterations are cached.

Figure 10:
FIG. 10 is an illustrative example of a screenshot from an application displaying one of the capabilities of the present invention according to one embodiment.
Figure 10:
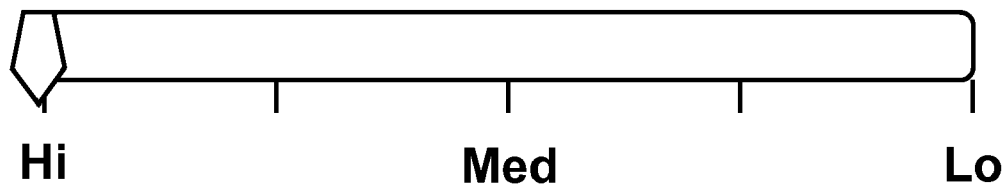
Figure 11:
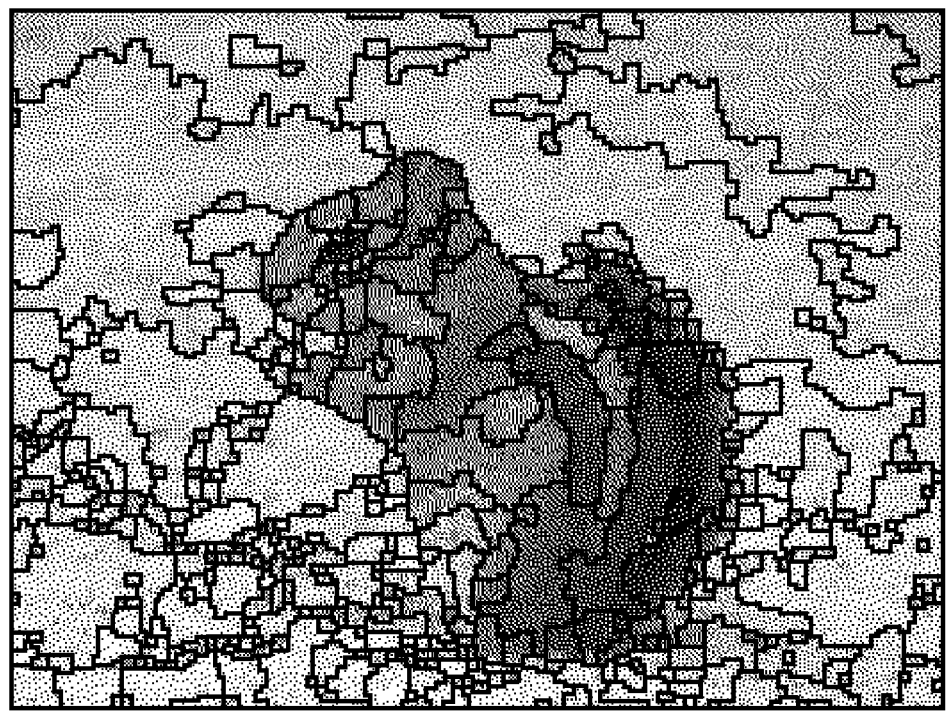
FIG. 11 is an illustrative example of the screenshot from FIG. 10 when the slider bar is set to "low".
Figure 11:
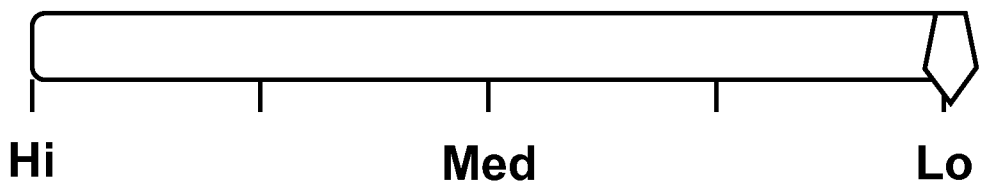
Figure 12:
FIG. 12 is an illustrative example of the screenshot from FIG. 11 where the average color of the segmented regions is displayed.
Figure 12:
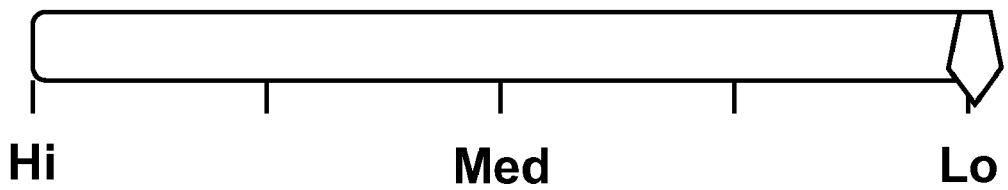

FIG. 10 is an illustrative example of a screenshot from an application displaying one of the capabilities of the present invention according to one embodiment. The screenshot comprises the image from FIG. 3 and a slider bar for controlling the details of the image. The detail here refers to the level of iteration to view. The level is set at "high" which provides the highest detail for the image. For this example, the highest detail level is set for the image without any segmented regions. FIG. 11 is an illustrative example of the screenshot from FIG. 10 when the slider bar is set to "low". For this example, the lowest detail level is set to the iteration level with the low-number of segmented regions as illustrated in FIG. 6. FIG. 12 is an illustrative example of the screenshot from FIG. 11 where the average color of the segmented regions is displayed.

In some embodiments, the user would be able to view results from other iterations by means of a sliding bar and would be able to preserve any previously selected segmented regions.

Figure 13:
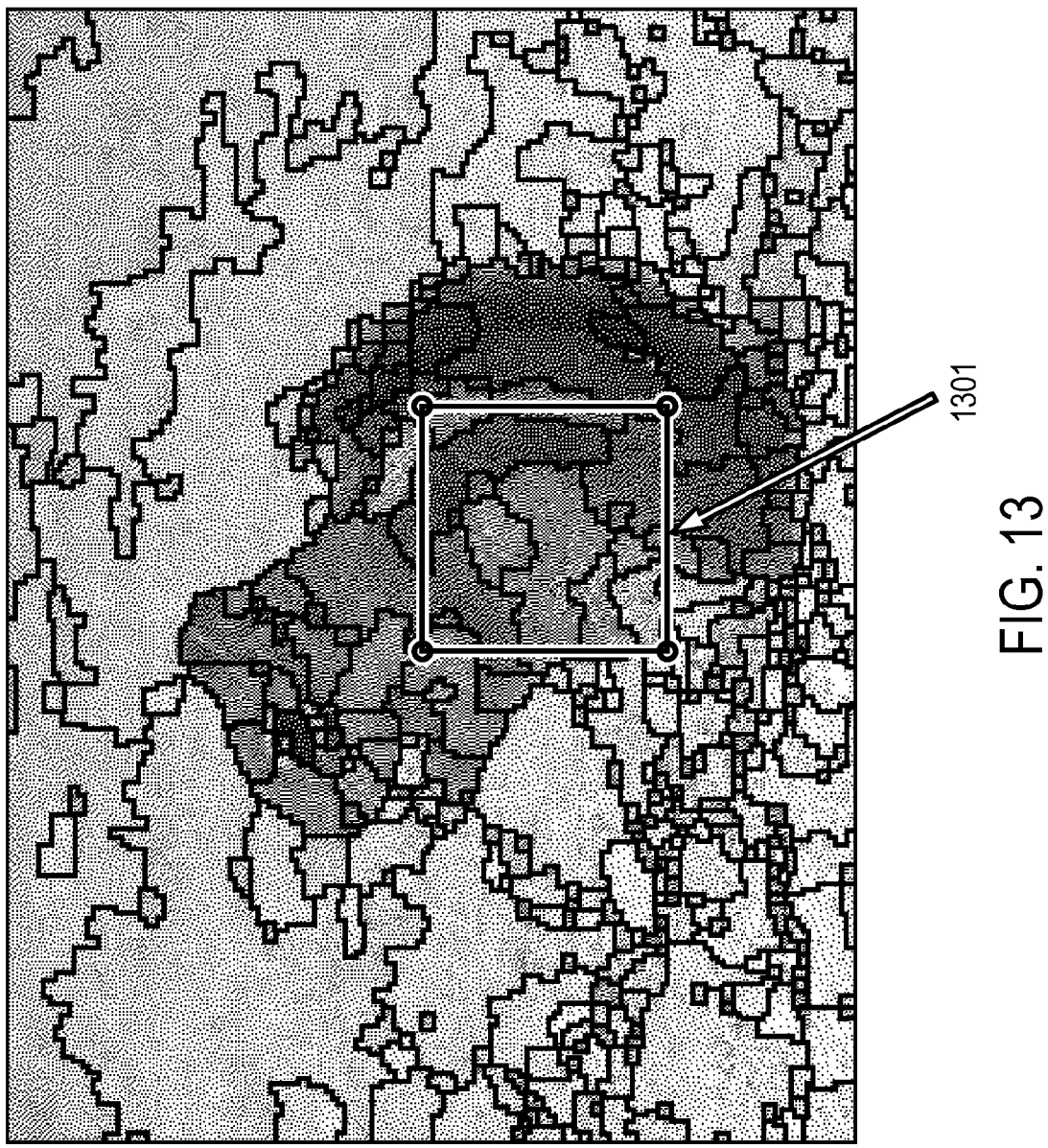
FIG. 13 is an illustrative example for a method, according to one embodiment, of enabling a user to select a region of interest to view different set of segmented regions from other iteration results.

In some embodiments, a user will be capable of selecting a region of interest. FIG. 13 is an illustrative example for a method, according to one embodiment, of enabling a user to select a region of interest to view different sets of segmented regions from other iteration results. The embodiment in FIG. 13 displays the image with low-number segmented regions from FIG. 6 and also displays a block 1301 which may be user defined. The pixels or region(s) of pixels within the block 1301 could be referred to as the region of interest. Without having to tweak any parameters, the user would be able to view the results of different iterations within the region of interest without affecting the portion of the image not falling within the region of interest. For example, a slide bar (not shown) could be used to view results from other iterations within the selected region of interest without affecting portions of the image that fall outside the region of interest.

Figure 14:
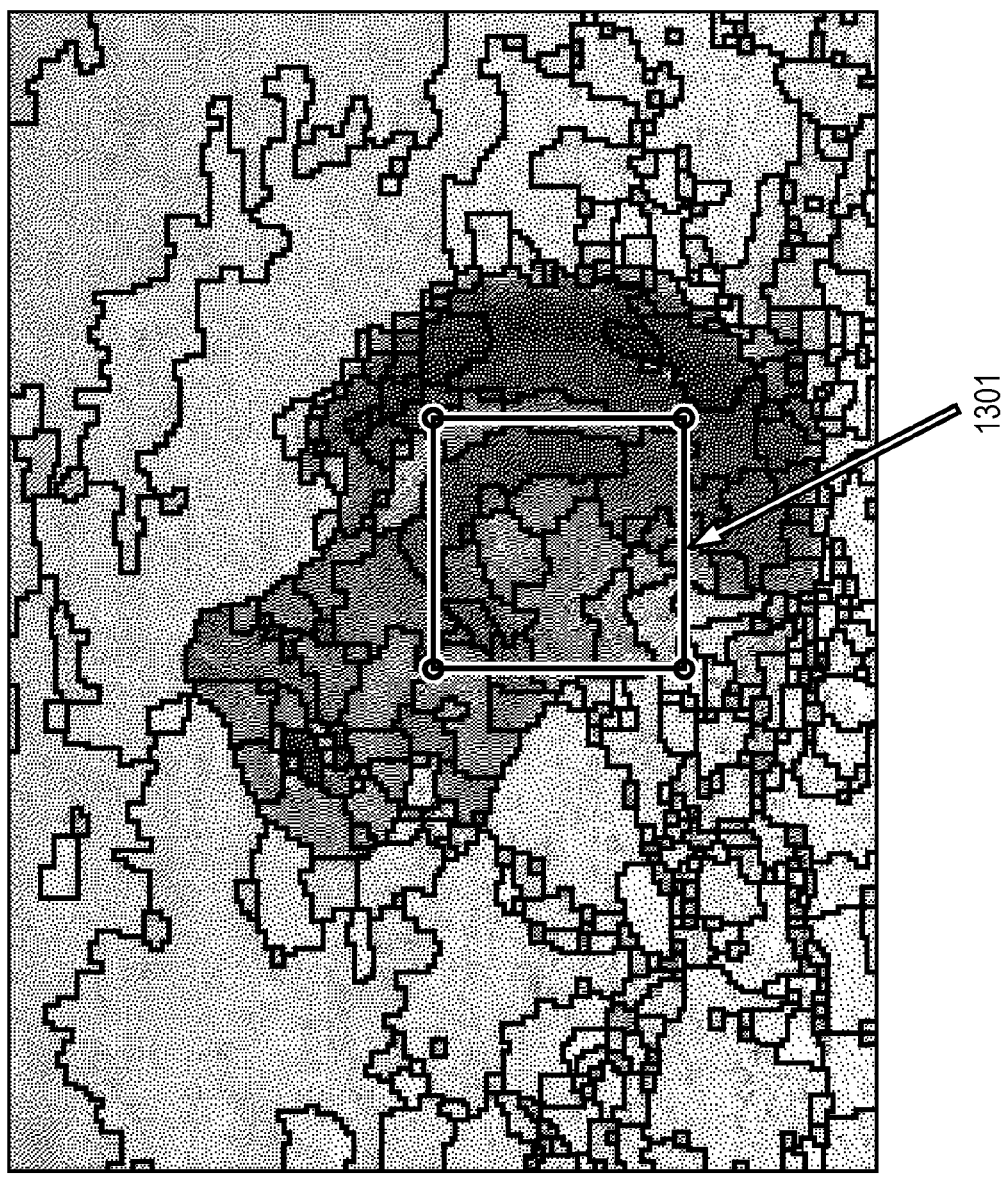
FIG. 14 is an illustrative example of the embodiment displayed in FIG. 13 with only the region of interest 1301 displaying the medium-number of segmented regions from FIG. 5.
Figure 15:
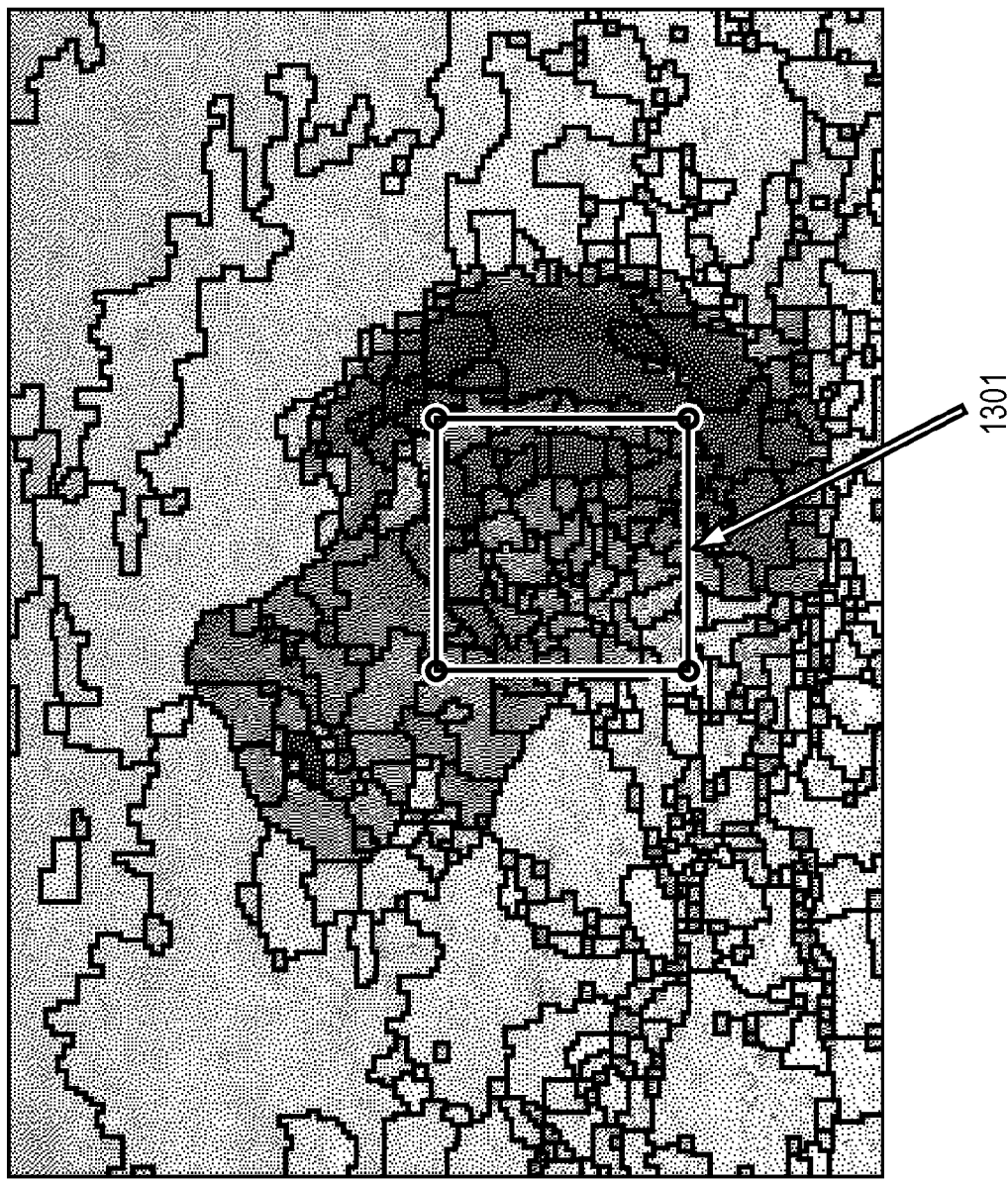
FIG. 15 is an illustrative example of the embodiment displayed in FIG. 13 with only the region of interest 1301 displaying the high-number of segmented regions from FIG. 4.

FIG. 14 is an illustrative example of the embodiment displayed in FIG. 13 with only the region of interest 1301 displaying the medium-number of segmented regions from FIG. 5 while portions outside the region of interest display low-number of segmented regions. FIG. 15 is an illustrative example of the embodiment displayed in FIG. 13 with only the region of interest 1301 displaying the high-number of segmented regions from FIG. 4. It will be evident to one skilled in the art that providing a region of interest 1301 can be viewed as a multi-scale approach where the scale is tuned to local information in the image. Each segmented region can be viewed as a hyper-pixel with unified information from its member pixels.

Thus, in the present invention, an image can be processed using a segmentation algorithm a plurality of times in a number of different ways. The processed image is then displayed and the user can using a convenient tool on a graphical user interface, such as a slide bar, to review the results of each iteration of the segmentation algorithm. When the user notes that the segmentation algorithm has done a particularly good job of segmenting a particular region of the image, the user can select that region of the image and fix the segmentation for that region. Thereafter, the segmentation in the region identified by the user is fixed. Then, the user can continue to adjust the segmentation in portions outside the fixed region by selecting the results of different iterations of the segmentation algorithm again using a convenient graphical user interface tool such as a slide bar. If desired, the user can unfix the segmentation in the previously fixed portion of the image. There is no limit to the number of different regions that can be fixed in this manner, with each of the different regions fixed to the result the same or different iteration of the segmentation algorithm.

In some embodiments, the input image is processed against ten or more iterations of one segmentation algorithm, where each iteration uses the same segmentation algorithm but a different parameter. In some embodiments, each successive parameter represents a stepwise increase or stepwise decrease in a parameter used in the segmentation algorithm. The user is then permitted to review the results of each iteration using a graphical user interface tool such as a slide bar.

In some embodiments, the input image is processed against fifty or more iterations of one segmentation algorithm, where each iteration uses the same segmentation algorithm but a different parameter. In some embodiments, each successive parameter represents a stepwise increase or stepwise decrease in a parameter used in the segmentation algorithm. The user is then permitted to review the results of each iteration using a graphical user interface tool such as a slide bar.

In some embodiments, the input image is processed against one hundred or more iterations of one segmentation algorithm, where each iteration uses the same segmentation algorithm but a different parameter. In some embodiments, each successive parameter represents a stepwise increase or stepwise decrease in a parameter used in the segmentation algorithm. The user is then permitted to review the results of each iteration using a graphical user interface tool such as a slide bar.

In some embodiments, the input image is processed against ten or more iterations of each of one or more segmentation algorithms. The user is then permitted to review the results of each iteration using a graphical user interface tool such as a slide bar.

In some embodiments, the input image is processed against a plurality of iterations of one or more segmentation algorithms. The user is then permitted to review the results of each iteration using a graphical user interface tool such as a slide bar. The user is permitted to fix each region in a plurality of different regions in the image to the results of an iteration of a segmentation algorithm in the one or more segmentation algorithms.

Figure 16:
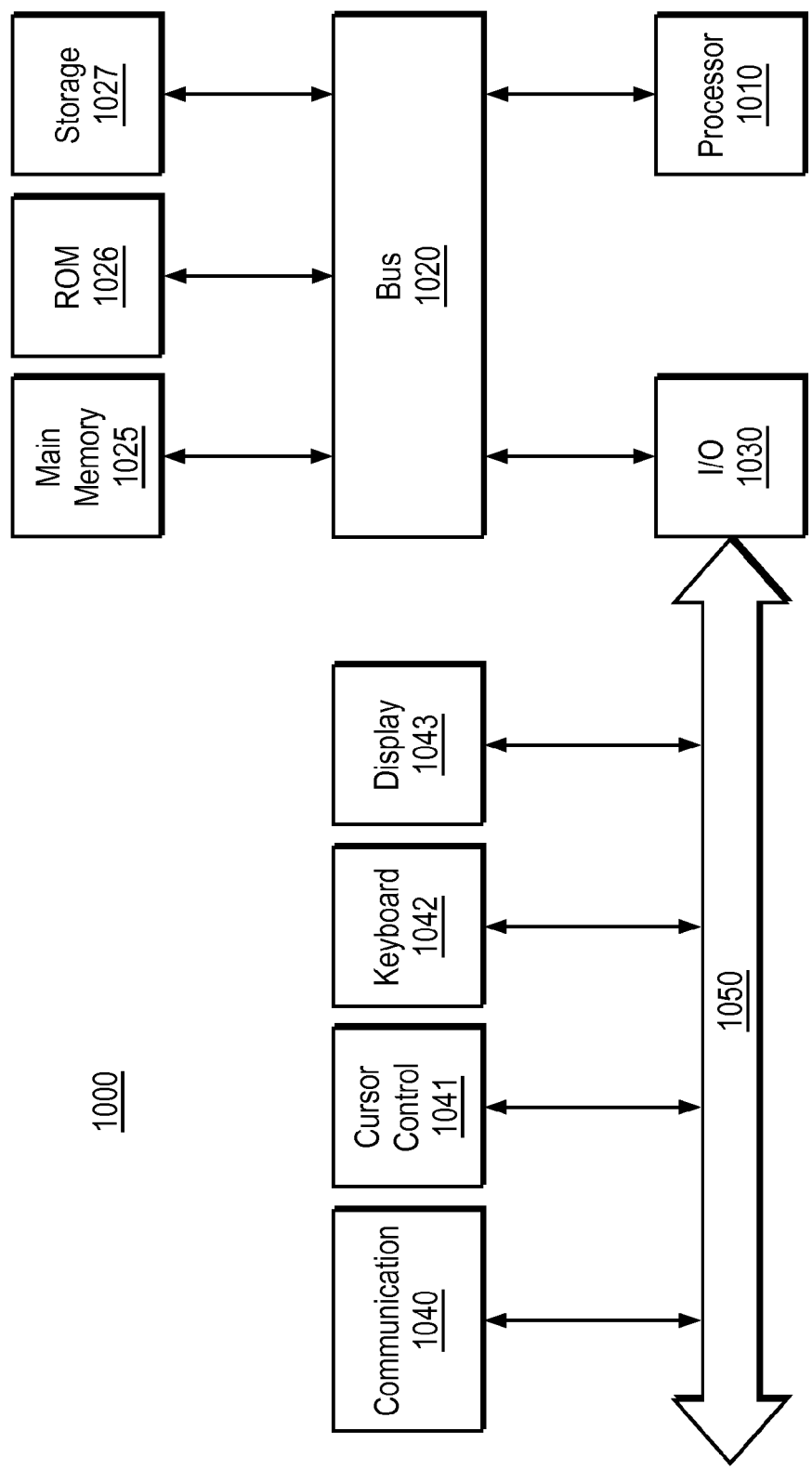
FIG. 16 is an exemplary illustration of computer architecture for use with the present system, according to one embodiment.

FIG. 16 is an exemplary illustration of computer architecture for use with the present system, according to one embodiment. Computer architecture 1000 can be used to implement the computer systems or image processing systems described in various embodiments of the invention. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 also may be used to store temporary variables or other intermediate information during execution of instructions by processor 1010. Architecture 1000 also may include a read only memory (ROM) and/or other static storage device 1026 coupled to bus 1020 for storing static information and instructions used by processor 1010.

A data storage device 1027 such as a magnetic disk or optical disk and its corresponding drive may also be coupled to computer system 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041). For example, web pages and business related information may be presented to the user on the display device 1043.

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by claims following.

What is claimed is:

1. A method of processing a digital image, said method comprising:
   automatically applying a segmentation algorithm to a digital image multiple times to form a plurality of image results, wherein for each image result of said plurality of image results at least one parameter of said segmentation algorithm is changed, and wherein each image result of said plurality of image results forms a plurality of segmented region images associated therewith;
   displaying the digital image on a display;
   overlaying a segmented region image from said plurality of segmented region images of an image result from said plurality of image results on said digital image; and
   providing a first user interface control for selection of a segment region image of said plurality of segment region images and for selection of an image result of said plurality of image results.

2. The method of claim 1 further comprising:
   receiving a user selection of a first region of the digital image; and
   providing a second user interface control for selection of an image result and a segment region image associated therewith for overlay on the first region, wherein said providing occurs when image results of regions other than said first region is held fixed.

3. The method of claim 2 further comprising:
receiving a user selection of an image result and a segment region image associated therewith for overlay on said first region.

4. The method of claim 3 further comprising:
in response to a user selection of an image result and a segment region image associated therewith for overlay on said first region, fixing the image result and the segment region image associated therewith for said first region.

5. The method of claim 2, wherein the first user interface control and the second user interface control is the same, wherein said first user interface control is operable to allow a user selection of an image result and a segment region image associated therewith for said first region when said first region is selected, and wherein said first user interface control is operable to allow a user selection of an image result and a segment region image associated therewith for regions other than said first region when said first region is not selected.

6. The method of claim 1, wherein a segment region image comprises pixels sharing at least one or more common attributes.

7. The method of claim 4, wherein said second user interface control is operable to unfix said fixed image result and said segment region image associated therewith for said first region in response to a user selection.

8. The method of claim 1, wherein an image result of said plurality of image results is selectable without re-application of said segmentation algorithm.

9. The method of claim 1, wherein the first user interface control is a slide bar.

10. The method of claim 1, wherein the segmentation algorithm is selected from a group consisting of a clustering method, a histogram-based method, an edge detection method, a region growing method, a level set method, a graph partitioning method, a watershed transformation, a model segmentation method, a multi-scale segmentation, a semi-automatic segmentation, or a neural network segmentation.

11. A computer readable storage medium having computer-readable program code stored thereon for causing a processor to implement a method comprising:
automatically applying a segmentation algorithm to a digital image multiple times to form a plurality of image results, wherein for each image result of said plurality of image results at least one parameter of said segmentation algorithm is changed, and wherein each image result of said plurality of image results forms a plurality of segmented region images associated therewith;
displaying the digital image on a display;
overlaying a segmented region image from said plurality of segmented region images of an image result from said plurality of image results on said digital image; and
providing a first user interface control for selection of a segment region image of said plurality of segment region images and for selection of an image result of said plurality of image results.

12. The computer readable storage medium of claim 11, wherein said method further comprises:
receiving a user selection of a first region of the digital image; and
providing a second user interface control for selection of an image result and a segment region image associated therewith for overlay on the first region, wherein said providing occurs when image results of regions other than said first region is held fixed.

13. The computer readable storage medium of claim 12, wherein said method further comprises:
receiving a user selection of an image result and a segment region image associated therewith for overlay on said first region.

14. The computer readable storage medium of claim 13, wherein said method further comprises:
in response to a user selection of an image result and a segment region image associated therewith for overlay on said first region, fixing the image result and the segment region image associated therewith for said first region.

15. The computer readable storage medium of claim 12, wherein the first user interface control and the second user interface control is the same, wherein said first user interface control is operable to allow a user selection of an image result and a segment region image associated therewith for said first region when said first region is selected, and wherein said first user interface control is operable to allow a user selection of an image result and a segment region image associated therewith for regions other than said first region when said first region is not selected.

16. The computer readable storage medium of claim 11, wherein a segment region image comprises pixels sharing at least one or more common attributes.

17. The computer readable storage medium of claim 14, wherein said second user interface control is operable to unfix said fixed image result and said segment region image associated therewith for said first region in response to a user selection.

18. The computer readable storage medium of claim 11, wherein the first user interface control is a slide bar.

19. The computer readable storage medium of claim 1, wherein the segmentation algorithm is selected from a group consisting of a clustering method, a histogram-based method, an edge detection method, a region growing method, a level set method, a graph partitioning method, a watershed transformation, a model segmentation method, a multi-scale segmentation, a semi-automatic segmentation, or a neural network segmentation.

20. A computer system comprising:
a processor;
a display; and
a memory coupled to said processor and said display, wherein said memory comprises computer-readable program code stored thereon for causing said processor to implement a method comprising:
automatically applying a segmentation algorithm to a digital image multiple times to form a plurality of image results, wherein for each image result of said plurality of image results at least one parameter of said segmentation algorithm is changed, and wherein each image result of said plurality of image results forms a plurality of segmented region images associated therewith;
displaying the digital image on said display;
overlaying a segmented region image from said plurality of segmented region images of an image result from said plurality of image results on said digital image; and
providing a first user interface control for selection of a segment region image of said plurality of segment region images and for selection of an image result of said plurality of image results.

* * * * *